(12) United States Patent
Cao

(10) Patent No.: US 10,936,715 B1
(45) Date of Patent: Mar. 2, 2021

(54) DETECTING FRAUDULENT FACIAL RECOGNITION

(71) Applicant: Advanced New Technologies Co., Ltd., George Town (KY)

(72) Inventor: Jiajiong Cao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/804,635

(22) Filed: Feb. 28, 2020

Related U.S. Application Data

(63) Continuation of application No. PCT/CN2020/070248, filed on Jan. 14, 2020.

(30) Foreign Application Priority Data

Aug. 6, 2019 (CN) .......................... 2019 1 0722542

(51) Int. Cl.
*G06F 21/55* (2013.01)
*G06F 16/2458* (2019.01)
*G06N 5/04* (2006.01)
*G06N 5/00* (2006.01)
*G06N 20/20* (2019.01)
(Continued)

(52) U.S. Cl.
CPC .......... *G06F 21/55* (2013.01); *G06F 16/2474* (2019.01); *G06K 9/00288* (2013.01); *G06K 9/00899* (2013.01); *G06N 5/003* (2013.01); *G06N 5/04* (2013.01); *G06N 20/10* (2019.01); *G06N 20/20* (2019.01); *G06F 2221/034* (2013.01)

(58) Field of Classification Search
None
See application file for complete search history.

(56) References Cited

U.S. PATENT DOCUMENTS 9,774,824 B1 * 9/2017 Brady .................... H04L 67/18
2016/0125404 A1 5/2016 Roof
(Continued)

FOREIGN PATENT DOCUMENTS

| CN | 103530543 | 1/2014 |
|---|---|---|
| CN | 105138981 | 12/2015 |
| CN | 105512632 | 4/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Chan S Park
*Assistant Examiner* — Elisa M Rice
(74) *Attorney, Agent, or Firm* — Fish & Richardson P.C.

(57) ABSTRACT

A computer-implemented method for detecting fraudulent behavior in a facial recognition process includes: receiving, by a computing device, a facial recognition request from a user; collecting bypass information of the user, in which the bypass information includes user device information and user behavior information; inputting the bypass information into at least one decision model to obtain a bypass decision result; and determining, based on the bypass decision result, whether fraudulent behavior is present in the facial recognition process.

25 Claims, 4 Drawing Sheets

(51) Int. Cl.
*G06K 9/00* (2006.01)
*G06N 20/10* (2019.01)

(56) References Cited

U.S. PATENT DOCUMENTS

2017/0300911 A1   10/2017  Alnajem
2018/0039990 A1*   2/2018  Lindemann ............. G06F 21/31

FOREIGN PATENT DOCUMENTS

| CN | 107832669 | 3/2018 |
| CN | 108023876 | 5/2018 |
| CN | 108376239 | 8/2018 |
| CN | 109272398 | 1/2019 |
| CN | 109446981 | 3/2019 |
| CN | 109784015 | 5/2019 |
| CN | 110532895 | 12/2019 |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln No. PCT/CN2020/072048, dated Apr. 27, 2020, 17 pages (with English translation).

\* cited by examiner

DETECTING FRAUDULENT FACIAL RECOGNITION

CROSS-REFERENCE TO RELATED APPLICATIONS

This application is a continuation of PCT Application No. PCT/CN2020/072048, filed on Jan. 14, 2020, which claims priority to Chinese Patent Application No. 201910722542.2, filed on Aug. 6, 2019, and each application is hereby incorporated by reference in its entirety.

TECHNICAL FIELD

One or more implementations of the present specification relate to the field of computer technologies, and in particular, to methods, apparatuses, and devices for detecting a fraudulent behavior in a face recognition process.

BACKGROUND

Face recognition is a landmark technology and application of an artificial intelligence society. Currently, face recognition improves production efficiency and user experience a lot in scenarios such as payment, travel, and campus. However, sometimes a non-human or non-live object is used in face recognition, which is a fraudulent behavior. For example, a photo or a video is used to replace a live object in the face recognition. Such a fraudulent behavior is also known as a biometric attack.

SUMMARY

One or more implementations of the present specification describe methods, apparatuses and devices for detecting a fraudulent behavior in a face recognition process, to improve accuracy of detecting a fraud behavior.

According to a first aspect, a method for detecting a fraudulent behavior in a face recognition process is provided, including: receiving a face recognition request from a user; collecting bypass information of the user in a process of processing the face recognition request, where the bypass information includes device information and user behavior information; inputting the bypass information into at least one decision model to obtain a bypass decision result, where the bypass decision result is used to predict a probability of a fraudulent behavior in the face recognition; and determining, based on at least the bypass decision result, whether a fraudulent behavior occurs in the face recognition.

According to a second aspect, an apparatus for detecting a fraudulent behavior in a face recognition process is provided, including: a receiving unit, configured to receive a face recognition request from a user; a collection unit, configured to collect bypass information of the user in a process of processing the face recognition request, where the bypass information includes device information and user behavior information; an input unit, configured to input the bypass information into at least one decision model to obtain a bypass decision result, where the bypass decision result is used to predict a probability of a fraudulent behavior in the face recognition; and a determining unit, configured to determine, based on at least the bypass decision result, whether a fraudulent behavior occurs in the face recognition.

According to a third aspect, a device for detecting a fraudulent behavior in a face recognition process is provided, including: a memory; at least one processor; and at least one program, where the at least one program is stored in the memory and configured to be executed by the at least one processor to implement the following steps: receiving a face recognition request from a user; collecting bypass information of the user in a process of processing the face recognition request, where the bypass information includes device information and user behavior information; inputting the bypass information into at least one decision model to obtain a bypass decision result, where the bypass decision result is used to predict a probability of a fraudulent behavior in the face recognition; and determining, based on at least the bypass decision result, whether a fraudulent behavior occurs in the face recognition.

One or more implementations of the present specification provide a method, apparatus, and device for detecting a fraudulent behavior in a face recognition process. The method includes: receiving a face recognition request from a user; collecting bypass information of the user in a process of processing the face recognition request, where the bypass information includes device information and user behavior information; inputting the bypass information into at least one decision model to obtain a bypass decision result, where the bypass decision result is used to predict a probability of a fraudulent behavior in the face recognition; and determining, based on at least the bypass decision result, whether a fraudulent behavior occurs in the face recognition. In other words, in the solutions provided in the present specification, a fraudulent behavior can be detected based on bypass information. Because the bypass information is not easily affected by environmental factors, that is, the bypass information is relatively stable, stability of the method for detecting a fraudulent behavior provided in the present specification can be improved.

BRIEF DESCRIPTION OF DRAWINGS

To describe the technical solutions in the implementations of the present specification more clearly, the following briefly introduces the accompanying drawings required for describing the implementations. Clearly, the accompanying drawings in the following description are merely some implementations of the present specification, and a person of ordinary skill in the field can still derive other drawings from these accompanying drawings without creative efforts.

DESCRIPTION OF IMPLEMENTATIONS

The solutions provided in the present specification are described below with reference to the accompanying drawings.

Figure 1:
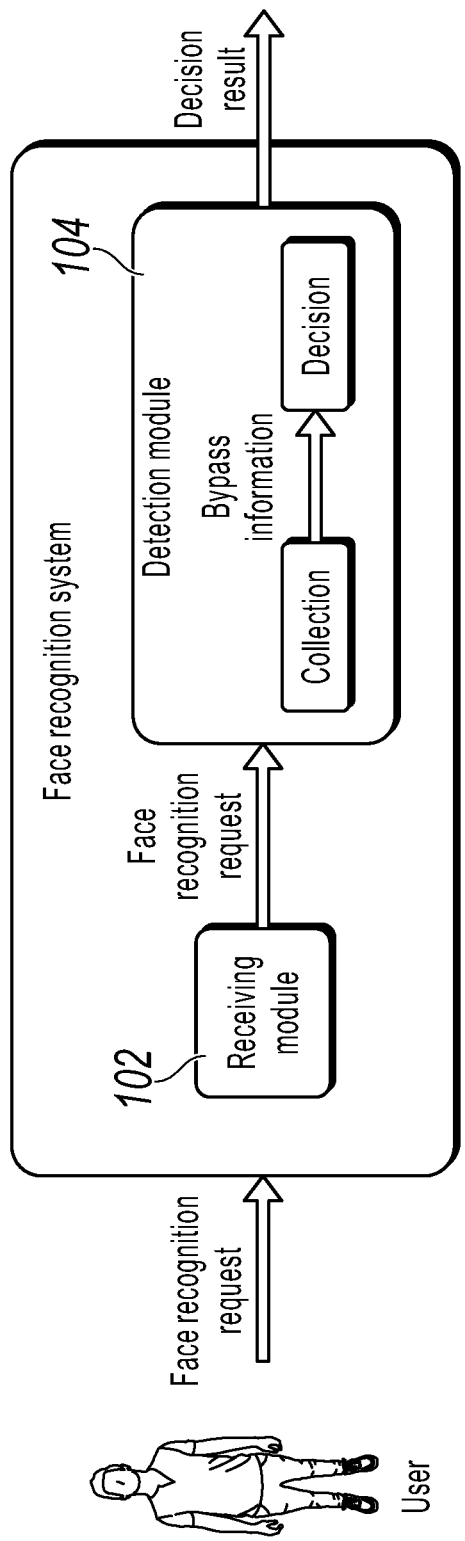
FIG. 1 is a schematic diagram illustrating a face recognition system, according to the present specification.

FIG. 1 is a schematic diagram illustrating a face recognition system, according to the present specification. As shown in FIG. 1, the face recognition system can include a receiving module 102 and a detection module 104. The receiving module 102 is configured to receive a face recognition request from a user. The detection module 104 is configured to detect a fraudulent behavior based on bypass information of the user. The bypass information here refers to other types of information other than image information (which is described later). Of course, in actual applications, to improve accuracy of fraudulent behavior detection, image information of a user can also be used for fraudulent behavior detection. This is not limited in the present specification.

The following describes in detail the fraudulent behavior detection process with reference to the accompanying drawings.

Figure 2:
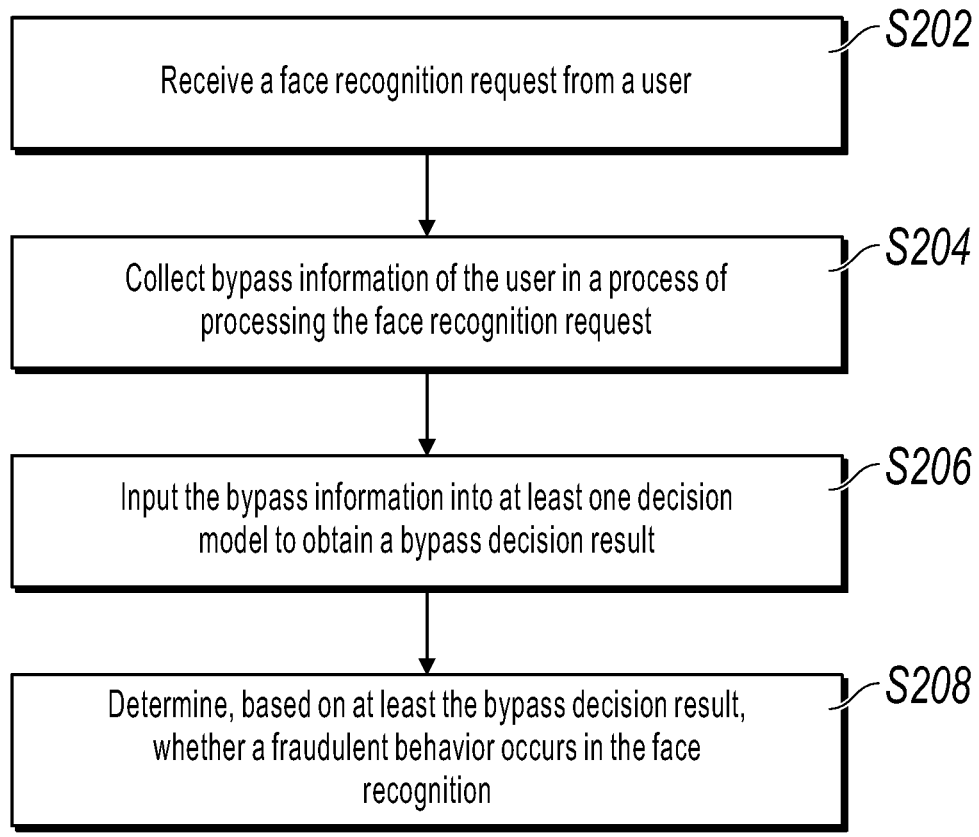
FIG. 2 is a flowchart illustrating a method for detecting a fraudulent behavior in a face recognition process, according to an implementation of the present specification.

FIG. 2 is a flowchart illustrating a method for detecting a fraudulent behavior in a face recognition process, according to an implementation of the present specification. The method can be executed by a device (that is, a server, a system, or an apparatus) that has a processing capability, for example, the face recognition system in FIG. 1. As shown in FIG. 2, the method can specifically include the following steps:

Step S202: Receive a face recognition request from a user.

In an example, the face recognition request can be received after the user operates a button used to trigger the face recognition process.

Step S204: Collect bypass information of the user in a process of processing the face recognition request.

The bypass information can include device information and user behavior information. The information about a device includes at least one of position sensor information of the device and temperature sensor information of the device. The user behavior information includes at least one of operation history information of the user before the face recognition request is sent, time consumption information of the user in the face recognition process, and distance information of a distance between the user and the device.

It is worthwhile to note that, each of previously described type of information can be divided into two categories based on whether information is changed during the face recognition process: constant information (Iconst) and time sequence information (Iseq). The following describes in detail the two types of bypass information.

The constant information can refer to information that does not change in the face recognition process. The constant information can include at least one of time consumption information and operation history information. The time consumption information can include a time consumed for collection (Tc) and a time consumed for recognition (Tz). The time consumed for collection can be a total amount of time consumed for collecting the face information of the user in the face recognition process. The time consumed for recognition can be a total amount of time consumed for recognizing the collected face information by using a face recognition algorithm. Both the time consumed for collection and the time consumed for recognition can be obtained by using a timer.

The operation history information can also be referred to as Remote Procedure Call (RPC) information, which can be information about a series of operations performed by a user before performing face recognition, and is usually used to reflect behavior habits of the user. A series of operations here include but are not limited to clicking an advertisement, querying personal information, and changing a password. In an implementation, the operation history information of the user can be obtained by setting set up points on a page. Specifically, a set up point can be set in advance for an operation of a user such as clicking or dragging on a page, and then, when the user performs an operation such as clicking or dragging on a page, the corresponding set up point can be triggered to collect operation information of the operation performed by the user.

The following describes expressions of different types of constant information.

The time consumed for collection and the time consumed for recognition can be respectively expressed as follows:

$$T_c = t_1 - t_0$$

$$T_z = t_3 - t_2$$

where t0 is a start time of collection, and t1 is an end time of collection; and t2 is a start time of recognition, and t3 is an end time of recognition. Here, definitions of the time consumed for collection and the time consumed for recognition are described above, and are not repeated here.

The RPC information is information related to a series of click operations, and therefore has a corresponding length. In theory, RPC information of any length can be collected. For example, if 10 clicks performed by the user before face recognition are collected, the collected RPC information can be expressed as:

$$RPC_{10} = [r_0, r_1, \ldots, r_9]$$

In this example, the length of the collected RPC information can be 10, and r0 to r9 represent 10 consecutive clicks.

It is worthwhile to note that for the previous constant information, the following first data sequence can be formed after collection:

$$I_{const} = [T_c, T_z, RPC_{10}] = [T_c, T_z, r_0, r_1, \ldots, r_9]$$

The previous description has described the constant information in the bypass information. The following describes the time sequence information in the bypass information.

The time sequence information can refer to information that changes with time in the face recognition process, and can include at least one of position sensor information (L) of a device, temperature sensor information (W) of the device, and distance information (D) of a distance between a user and the device. The position sensor information here can be determined by obtaining Global Positioning System (GPS) data; and the temperature sensor information can be determined by obtaining temperature sensor data.

The position sensor information and temperature sensor information can be respectively expressed as:

$$L = [x, y, z]$$

$$W = w$$

where x, y, and z are GPS coordinates of the user device, w is an ambient temperature of the device.

It is worthwhile to note that the device can be monitored based on the position sensor information and temperature sensor information of the device in the present specification to determine whether the device is in an abnormal position or an abnormal environment.

In addition, the distance information of the distance between the user and the device can be expressed as:

$$D = d$$

where d is an average distance between the user's face and the device. For a device with a distance sensor, d can be determined by accessing data of the distance sensor.

The time sequence information changes with time. Therefore, the time sequence information can be collected at a plurality of moments based on a predetermined time interval. The time sequence information collected at a certain moment can be expressed as:

$$I_{seq}[L,W,D]=[x,y,z,w,d]$$

It is worthwhile to note that the time sequence information collected at the plurality of moments can form a second data sequence. For example, if the predetermined time interval is 100 ms and the collection lasts for 1 s, 10 pieces of time sequence information can be obtained, and the 10 pieces of time sequence information can form the following second data sequence:

$$I_{SEQ}=[I_{seq}^0, I_{seq}^1, \ldots I_{seq}^9]$$

It can be understood that a feature vector for representing bypass information can be formed based on the first data sequence and the second data sequence. The feature vector can be finally expressed as:

$$I=[I_{SEQ}, I_{const}]$$

In the present specification, bypass information is expressed as feature vectors, so that the bypass information can be easily input into a decision model.

In addition, not all the previously described types of bypass information can be obtained in some scenarios. For example, if a device does not include a temperature sensor, temperature sensor information cannot be obtained. For bypass information that cannot be obtained, a predefined average value can be padded. The predefined average value here can be calculated based on a large amount of temperature data. It can be understood that an adverse effect brought by a missing value can be reduced through padding for bypass information that is not obtained.

It is worthwhile to note that, in actual applications, other pre-processing operations, such as filtering processing, can also be performed on the bypass information to remove noise from the bypass information, which is not described in the present specification for simplicity.

It is also worthwhile to note that the previously described bypass information in the present specification is merely an example. In actual applications, other bypass information, such as a network status of the device, can also be obtained.

Step S206: Input the bypass information into at least one decision model to obtain a bypass decision result.

The bypass decision result is used to predict a probability of a fraudulent behavior in the face recognition. For example, the fraudulent behavior here includes maliciously using a photo or a video to replace a live object in the face recognition.

The at least one decision model can include a decision tree and/or a support vector machine (SVM). In addition, the at least one decision model can include a deep learning networks, etc. The decision tree and/or the support vector machine can be obtained through training based on a large number of bypass information with labels.

It can be understood that when there is only one decision model, for example, when only the decision tree (or the SVM) is included, after the bypass information is input to the decision tree (or the SVM), an output result is the previous decision result. When there is more than one decision model, output results of the decision models can be synthesized to obtain the decision result.

When there are two decision models, and the two models are the decision tree and the SVM, the process of determining the decision result can be as follows: input the bypass information into the decision tree to obtain a first decision result; input the bypass information into the SVM to obtain a second decision result, where the first decision result and the second decision result here can be probability values respectively output by the two decision models; and then synthesize (for example, performing averaging or weighted averaging on) the first decision result and the second decision result to obtain the bypass decision result.

It is worthwhile to note that, to further improve accuracy of fraudulent behavior detection, the solution can also include the following steps: obtaining an image decision result, where the image decision result is determined based on image information of the user and other decision models, and other decision models can be a neutral network, etc.; and fusing the bypass decision result and the image decision result to obtain the final decision result. Fusing here includes but is not limited to weighted averaging.

Taking the weighted averaging as an example, the fusion process can be as follows: determining a weight corresponding to the bypass decision result and a weight corresponding to the image decision result; and performing, based on the determined weights, weighted averaging on the bypass decision result and the image decision result to obtain the final decision result.

In an example, the bypass decision result and the image decision result can be synthesized based on the following formula:

$$P=(p_t+a*p_p)/(1+a)$$

where P is the final decision result; Pp is the bypass decision result; Pt is the image decision result; and a is the weight corresponding to the bypass decision result.

In an implementation, the weight corresponding to the bypass decision result and the weight corresponding to the image decision result can be predetermined.

In another implementation, the weight corresponding to the image decision result can be predetermined, for example, predetermined to 1. The weight corresponding to the bypass decision result can be determined through the following steps: sampling N values from a predetermined range; testing accuracy of the N values based on a predetermined test set to obtain accuracy of each of N values; selecting a value with highest accuracy from the N values; and determining the selected value as the weight corresponding to the bypass decision result. N is a positive integer.

For example, 50 candidate values of a can be obtained through sampling every 0.01 in the range of [0, 0.5]. For each candidate value, the accuracy is tested on a pre-collected test set; and finally, the candidate value corresponding to the highest accuracy is selected as the final value of a.

Step S208: Determine, based on at least the bypass decision result, whether a fraudulent behavior occurs in the face recognition.

It can be understood that when the image decision result is also obtained, it can be determined, based on the final decision result, whether a fraudulent behavior occurs in the face recognition. Because the bypass information and the image information can be well complemented, the performance and stability of the method for detecting a fraudulent behavior can be improved based on the final decision result.

A specific judgment process can be as follows: determine whether Pp or P is greater than a threshold T; if yes, determine that a fraudulent behavior occurs in the face recognition; or otherwise, determine that no fraudulent behavior occurs in the face recognition.

It is worthwhile to note that the previous step S202 is performed by the receiving module 102 in FIG. 1, and steps S204 to S208 are performed by the detection module 104.

In summary, according to the method for detecting a fraudulent behavior provided in this implementation of the present specification, a fraudulent behavior can be detected based on bypass information. Because the bypass information is not easily affected by environmental factors, that is, the bypass information is relatively stable, stability of the method for detecting a fraudulent behavior provided in the present specification can be greatly improved.

Figure 3:
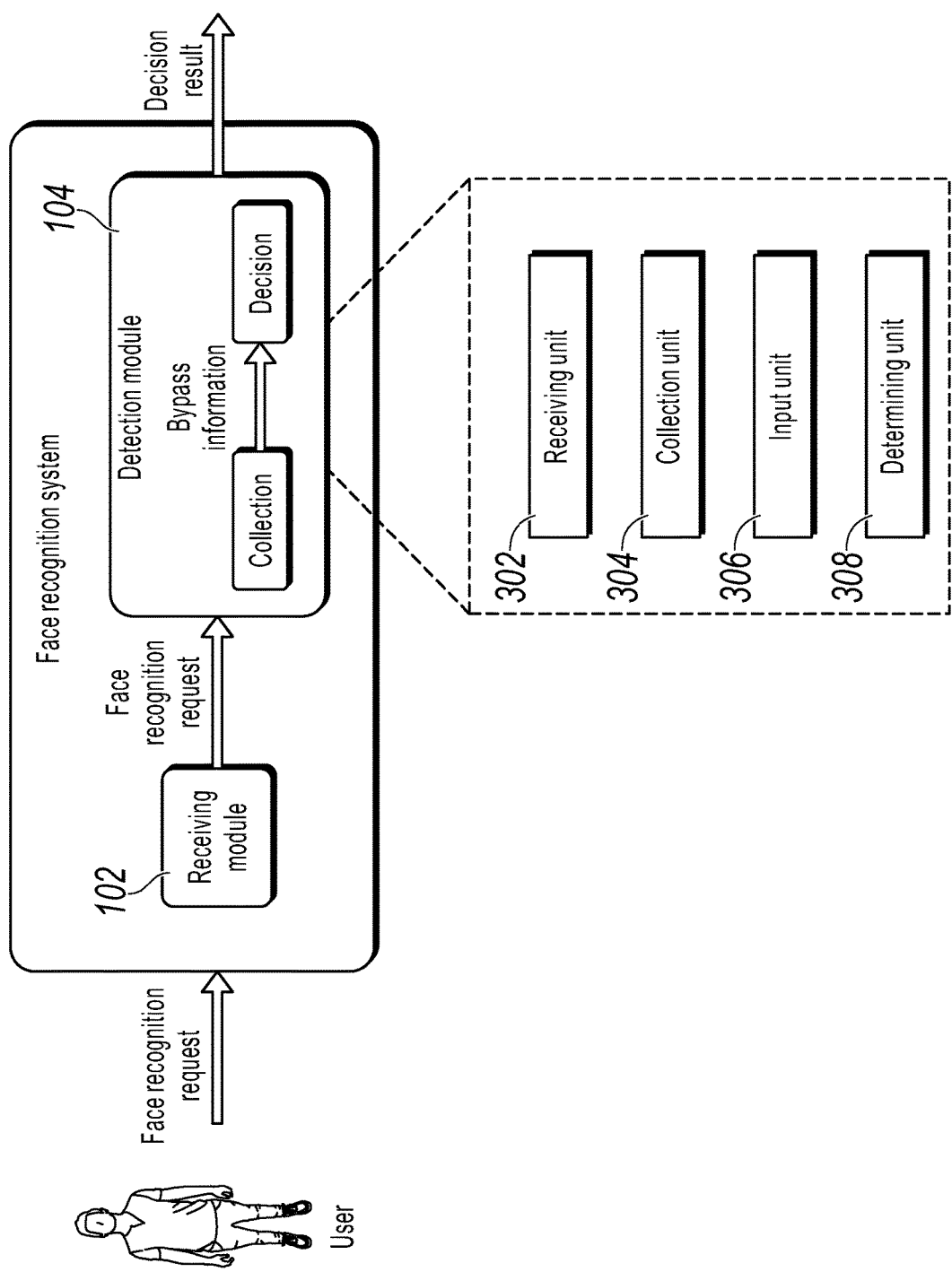
FIG. 3 is a schematic diagram illustrating an apparatus for detecting a fraudulent behavior in a face recognition process, according to an implementation of the present specification.

Corresponding to the previous method for detecting a fraudulent behavior in a face recognition process, an implementation of the present specification further provides an apparatus for detecting a fraudulent behavior in a face recognition process. As shown in FIG. 3, the apparatus can include: a receiving unit 302, a collection unit 304, an input unit 306, and determining unit 308.

The receiving unit 302 is configured to receive a face recognition request from a user.

The collection unit 304 is configured to collect bypass information of the user in a process of processing the face recognition request received by the receiving unit 302. The bypass information can include information about a device used by the device and user behavior information.

The information about a device includes at least one of position sensor information of the device and temperature sensor information of the device. The user behavior information can include at least one of operation history information of the user before the face recognition request is sent, time consumption information of the user in the face recognition process, and distance information of a distance between the user and the device.

The determining unit 304 can be specifically configured to: form a first data sequence based on constant information in the bypass information, where the constant information can include at least one of time consumption information and operation history information; collect the time sequence information in the bypass information at a plurality of moments based on a predetermined time interval, and form a second data sequence based on the time sequence information collected at the plurality of moments, where the time sequence information includes at least one of the position sensor information, the temperature sensor information, and the distance information; and form, based on the first data sequence and the second data sequence, a feature vector for representing the bypass information.

The input unit 306 is configured to input the bypass information collected by the collection unit 304 into at least one decision model to obtain a bypass decision result. The bypass decision result is used to predict a probability of a fraudulent behavior in the face recognition.

The at least one decision model here can include a decision tree and/or a support vector machine (SVM).

When at least one decision model includes a decision tree and a support vector machine (SVM), the input unit 306 can be specifically configured to: input the bypass information into the decision tree to obtain a first decision result; input the bypass information into the SVM to obtain the second decision result; and synthesize the first decision result and the second decision result to obtain the bypass decision result.

The determining unit 308 is configured to determine, based on at least the bypass decision result, whether a fraudulent behavior occurs in the face recognition.

The determining unit 308 can be specifically configured to: synthesize the bypass decision result and the image decision result to obtain the final decision result; and determine, based on the final decision result, whether a fraudulent behavior occurs in the face recognition.

The determining unit 308 can be further specifically configured to: determine a weight corresponding to the bypass decision result and a weight corresponding to the image decision result; and perform, based on the determined weights, weighted averaging on the bypass decision result and the image decision result to obtain the final decision result.

The determining unit 308 can be further specifically configured to: sample N values from a predetermined value; test accuracy of the N values based on a predetermined test set to obtain accuracy of each of N values; select a value with highest accuracy from the N values; and determine the selected value as the weight corresponding to the bypass decision result.

Optionally, the apparatus can further include:

The pre-processing unit (not shown in the figure) is configured to pre-process the bypass information to remove noise from the bypass information.

The pre-processing can include at least filtering processing and/or missing value padding.

The input unit 306 can be specifically configured to: input the pre-processed bypass information into at least one decision model to obtain the bypass decision result.

Optionally, the apparatus can further include: an acquisition unit (not shown in the figure), configured to obtain an image decision result, where the image decision result is determined based on image information of the user and other decision models.

The functions of the functional modules of the device in this implementation of the present specification can be implemented by the steps of the previous method implementations. Therefore, a specific working process of the device provided in this implementation of the present specification is omitted here.

According to the apparatus for detecting a fraudulent behavior in a face recognition process provided in this implementation of the present specification, the receiving unit 302 receives a face recognition request from a user. The collection unit 304 collects the bypass information of the user in the process of processing the face recognition request, where the bypass information can include information about a device used by the device and user behavior information. The input unit 306 inputs the bypass information into at least one decision model to obtain a bypass decision result, where the bypass decision result is used to predict a probability of a fraudulent behavior in the face recognition. The determining unit 308 determines, based on at least the bypass decision result, whether a fraudulent behavior occurs in the face recognition. Therefore, the accuracy of fraudulent behavior detection can be improved.

It is worthwhile to note that the functions of the receiving unit 302 can be implemented by the receiving module 102 in FIG. 1, and the functions of the collection unit 304, the input unit 306, and the determining unit 308 can be implemented by the detection module 104 in FIG. 1.

Figure 4:
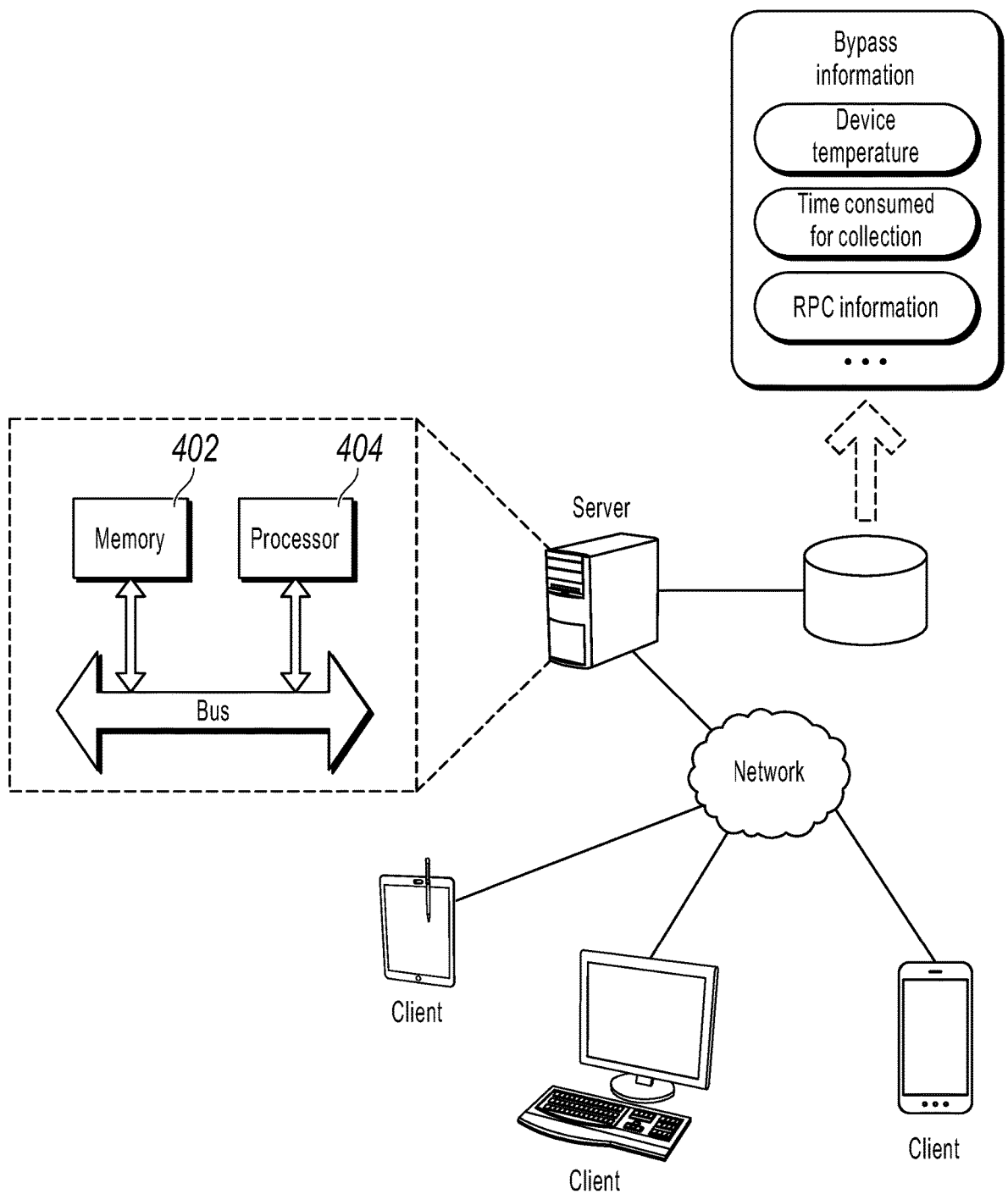
FIG. 4 is a schematic diagram illustrating a device for detecting a fraudulent behavior in a face recognition process, according to an implementation of the present specification.

Corresponding to the previous method for detecting a fraudulent behavior in a face recognition process, an implementation of the present specification further provides a device for detecting a fraudulent behavior in a face recognition process. As shown in FIG. 4, the device can include a memory 402, at least one processor 404, and at least one program. The at least one program is stored in the memory 402 and is configured to be executed by the at least one processor 404 to implement the following steps: receiving a face recognition request from a user; collecting bypass information of the user in a process of processing the face recognition request, where the bypass information includes device information and user behavior information; inputting the bypass information into at least one decision model to obtain a bypass decision result, where the bypass decision result is used to predict a probability of a fraudulent behavior in the face recognition; and determining, based on at least the bypass decision result, whether a fraudulent behavior occurs in the face recognition.

The device for detecting a fraudulent behavior in a face recognition process provided in this implementation of the present specification can improve accuracy of the fraudulent behavior detection.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The method or algorithm steps described in connection with the disclosure of the present specification can be implemented by using hardware, or may be implemented by using a processor by executing a software instruction. The software instruction can include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to a processor, so that the processor can read information from the storage medium and write information into the storage medium. Of course, the storage medium may be a component of the processor. The processor and the storage medium may be located in the ASIC. In addition, the ASIC can be located in a server. Of course, the processor and the storage medium may exist in the server as discrete components.

A person skilled in the art should be aware that, in one or more of the previous examples, the functions described in the present invention can be implemented by using hardware, software, firmware, or any combination thereof. When these functions are implemented by software, they can be stored in a computer readable medium or transmitted as one or more instructions or code lines on the computer readable medium. Computer readable media include computer storage and communications media, where communication media include any medium that can be used to transfer computer programs from one place to another. The storage medium can be any medium accessible to a general-purpose or special-purpose computer.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The previous specific implementations further describe the object, technical solutions, and beneficial effects of the present specification in detail. It should be understood that the previous descriptions are merely specific implementations of the present specification and are not intended to limit the protection scope of the present specification. Any modification, equivalent replacement, and improvement made based on the technical solutions of the present specification shall fall within the protection scope of the present specification.

What is claimed is:

1. A computer-implemented method for detecting fraudulent behavior in a facial recognition process, comprising:
    receiving, by a computing device, a facial recognition request from a user;
    collecting bypass information of the user, wherein the bypass information comprises user device information and user behavior information,
        wherein the user device information comprises at least a portion of time sequence information that changes over time during a predetermined time interval during the facial recognition process, the time sequence information comprising data corresponding to each time point of a plurality of time points of the predetermined time interval, and
        wherein the user behavior information comprises at least a portion of constant information that does not change during the predetermined time interval;
    forming a first data object comprising the time sequence information;
    forming a second data object comprising the constant information;
    combining the first data object and the second data object into a feature data object;
    inputting the feature data object into at least one decision model to obtain a bypass decision result; and
    determining, based on the bypass decision result, whether fraudulent behavior is present in the facial recognition process.

2. The computer-implemented method of claim 1, wherein the user device information comprises at least one of: position sensor information of a user device and temperature sensor information of the user device; and
    wherein the user behavior information comprises at least one of: operation history information of the user from before the facial recognition request is sent, time consumption information during the facial recognition process, and distance information describing a distance between the user and the user device.

3. The computer-implemented method of claim 2, wherein the constant information comprises at least one of the time consumption information and the operation history information; and
    wherein the time sequence information comprises at least one of the position sensor information, the temperature sensor information, and distance information.

4. The computer-implemented method of claim 1, wherein the at least one decision model comprises a decision tree and a support vector machine (SVM), and wherein inputting the feature data object into the at least one decision model to obtain the bypass decision result comprises:
    inputting the feature data object into the decision tree to obtain a first decision result;
    inputting the feature data object into the SVM to obtain a second decision result; and
    synthesizing the first decision result and the second decision result to obtain the bypass decision result.

5. The computer-implemented method of claim 1, further comprising:
    obtaining image information of the user; and
    determining, based on the image information of the user and an image decision model, an image decision result, wherein determining whether fraudulent behavior is present in the facial recognition process comprises:

synthesizing the bypass decision result and the image decision result to obtain a final decision result; and determining, based on the final decision result, whether fraudulent behavior is present in the facial recognition process.

6. The computer-implemented method of claim 5, wherein synthesizing the bypass decision result and the image decision result comprises:

determining a first weight corresponding to the bypass decision result and a second weight corresponding to the image decision result; and performing, based on the determined first weight and second weight, weighted averaging on the bypass decision result and the image decision result to obtain the final decision result.

7. The computer-implemented method of claim 6, wherein determining the first weight corresponding to the bypass decision result comprises:

sampling test values from a predetermined value range;

for each of the test values, testing the test value on a pre-collected test set to obtain an accuracy of the test value; and selecting, as the first weight, a test value having the highest accuracy of the test values.

8. A non-transitory, computer-readable medium storing one or more instructions that, when executed by a computer system, cause the computer system to perform operations for detecting fraudulent behavior in a facial recognition process, the operations comprising:

receiving, by a computing device, a facial recognition request from a user;

collecting bypass information of the user, wherein the bypass information comprises user device information and user behavior information, wherein the user device information comprises at least a portion of time sequence information that changes over time during a predetermined time interval during the facial recognition process, the time sequence information comprising data corresponding to each time point of a plurality of time points of the predetermined time interval, and wherein the user behavior information comprises at least a portion of constant information that does not change during the predetermined time interval;

forming a first data object comprising the time sequence information;

forming a second data object comprising the constant information;

combining the first data object and the second data object into a feature data object;

inputting the feature data object into at least one decision model to obtain a bypass decision result; and determining, based on the bypass decision result, whether fraudulent behavior is present in the facial recognition process.

9. The non-transitory, computer-readable medium of claim 8, wherein the user device information comprises at least one of: position sensor information of a user device and temperature sensor information of the user device; and wherein the user behavior information comprises at least one of: operation history information of the user from before the facial recognition request is sent, time consumption information during the facial recognition process, and distance information describing a distance between the user and the user device.

10. The non-transitory, computer-readable medium of claim 9, wherein the constant information comprises at least one of the time consumption information and the operation history information, and wherein the time sequence information comprises at least one of the position sensor information, the temperature sensor information, and distance information.

11. The non-transitory, computer-readable medium of claim 8, wherein the at least one decision model comprises a decision tree and a support vector machine (SVM), and wherein inputting the feature data object into the at least one decision model to obtain the bypass decision result comprises:

inputting the feature data object into the decision tree to obtain a first decision result;

inputting the feature data object into the SVM to obtain a second decision result; and synthesizing the first decision result and the second decision result to obtain the bypass decision result.

12. The non-transitory, computer-readable medium of claim 8, wherein the operations further comprise:

obtaining image information of the user; and determining, based on the image information of the user and an image decision model, an image decision result, wherein determining whether fraudulent behavior is present in the facial recognition process comprises:

synthesizing the bypass decision result and the image decision result to obtain a final decision result; and determining, based on the final decision result, whether fraudulent behavior is present in the facial recognition process.

13. The non-transitory, computer-readable medium of claim 12, wherein synthesizing the bypass decision result and the image decision result comprises:

determining a first weight corresponding to the bypass decision result and a second weight corresponding to the image decision result; and performing, based on the determined first weight and second weight, weighted averaging on the bypass decision result and the image decision result to obtain the final decision result.

14. The non-transitory, computer-readable medium of claim 13, wherein determining the first weight corresponding to the bypass decision result comprises:

sampling test values from a predetermined value range;

for each of the test values, testing the test value on a pre-collected test set to obtain an accuracy of the test value; and selecting, as the first weight, a test value having the highest accuracy of the test values.

15. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations for detecting fraudulent behavior in a facial recognition process, the operations comprising:

receiving, by a computing device, a facial recognition request from a user;

collecting bypass information of the user, wherein the bypass information comprises user device information and user behavior information, wherein the user device information comprises at least a portion of time sequence information that changes over time during a predetermined time interval during the facial recognition process, the time sequence information comprising data corresponding to each time point of a plurality of time points of the predetermined time interval, and wherein the user behavior information comprises at least a portion of constant information that does not change during the predetermined time interval;

forming a first data object comprising the time sequence information;

forming a second data object comprising the constant information;

combining the first data object and the second data object into a feature data object;

inputting the feature data object into at least one decision model to obtain a bypass decision result; and determining, based on the bypass decision result, whether fraudulent behavior is present in the facial recognition process.

16. The computer-implemented system of claim 15, wherein the user device information comprises at least one of: position sensor information of a user device and temperature sensor information of the user device; and wherein the user behavior information comprises at least one of: operation history information of the user from before the facial recognition request is sent, time consumption information during the facial recognition process, and distance information describing a distance between the user and the user device.

17. The computer-implemented system of claim 16, wherein the constant information comprises at least one of the time consumption information and the operation history information, and wherein the time sequence information comprises at least one of the position sensor information, the temperature sensor information, and distance information.

18. The computer-implemented system of claim 15, wherein the at least one decision model comprises a decision tree and a support vector machine (SVM), and wherein inputting the feature data object into the at least one decision model to obtain the bypass decision result comprises:

inputting the feature data object into the decision tree to obtain a first decision result;

inputting the feature data object into the SVM to obtain a second decision result; and synthesizing the first decision result and the second decision result to obtain the bypass decision result, result and the second decision result to obtain the bypass decision result.

19. The computer-implemented system of claim 15, wherein the operations further comprise:

obtaining image information of the user; and determining, based on the image information of the user and an image decision model, an image decision result, wherein determining whether fraudulent behavior is present in the facial recognition process comprises:

synthesizing the bypass decision result and the image decision result to obtain a final decision result; and determining, based on the final decision result, whether fraudulent behavior is present in the facial recognition process.

20. The computer-implemented system of claim 19, wherein synthesizing the bypass decision result and the image decision result comprises:

determining a first weight corresponding to the bypass decision result and a second weight corresponding to the image decision result; and performing, based on the determined first weight and second weight, weighted averaging on the bypass decision result and the image decision result to obtain the final decision result.

21. The computer-implemented method of claim 1, wherein the predetermined time interval comprises a time interval during which facial information of the user is collected.

22. The computer-implemented method of claim 1, wherein the time sequence information comprises data in a plurality of categories, wherein the first data object comprises a first data vector, and wherein forming the first data object comprises concatenating data across the plurality of categories to form the first data vector.

23. The computer-implemented method of claim 22, wherein the feature data object comprises a feature data vector, wherein the second data object comprises a second data vector, and wherein combining the first data object and the second data object comprises concatenating the first data vector and the second data vector to form the feature data vector.

24. The computer-implemented method of claim 2, wherein the user behavior information comprises the time consumption information, and wherein the time consumption information comprises at least one of a time consumed in collecting facial information of the user, and a time consumed in recognizing the collected facial information of the user.

25. The computer-implemented method of claim 1, comprising:

identifying a category of bypass information that cannot be obtained by a user device; and using an average value for the identified category of bypass information to replace a missing value for the identified category of bypass information.

* * * * *

UNITED STATES PATENT AND TRADEMARK OFFICE
CERTIFICATE OF CORRECTION

PATENT NO. : 10,936,715 B1
APPLICATION NO. : 16/804635
DATED : March 2, 2021
INVENTOR(S) : Jiajiong Cao Page 1 of 1

It is certified that error appears in the above-identified patent and that said Letters Patent is hereby corrected as shown below:

On the Title Page

Related U.S. Application Data Item (63), delete "PCT/CN2020/070248" and insert
-- PCT/CN2020/072048, --, therefor.

In the Claims

Column 10/ Line 46, In Claim 3, delete "information;" and insert -- information, --, therefor.

Column 13/ Lines 49-51, In Claim 18, after "decision" delete "result, result and the second decision result to obtain the bypass decision".

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*